US011995164B2

(12) United States Patent
Takenouchi

(10) Patent No.: US 11,995,164 B2
(45) Date of Patent: May 28, 2024

(54) AUTHENTICATION CANDIDATE EXTRACTION APPARATUS, AUTHENTICATION SYSTEM, AUTHENTICATION CANDIDATE EXTRACTION METHOD, AND PROGRAM

(71) Applicant: NEC Corporation, Tokyo (JP)

(72) Inventor: Takao Takenouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 457 days.

(21) Appl. No.: 17/287,728

(22) PCT Filed: Oct. 26, 2018

(86) PCT No.: PCT/JP2018/039797
§ 371 (c)(1),
(2) Date: Apr. 22, 2021

(87) PCT Pub. No.: WO2020/084748
PCT Pub. Date: Apr. 30, 2020

(65) Prior Publication Data
US 2021/0397685 A1 Dec. 23, 2021

(51) Int. Cl.
*G07C 9/25* (2020.01)
*G06F 21/32* (2013.01)
(Continued)

(52) U.S. Cl.
CPC ............ *G06F 21/32* (2013.01); *G07C 9/10* (2020.01); *G07C 9/253* (2020.01); *H04L 9/085* (2013.01); G07C 2209/12 (2013.01); H04L 9/008 (2013.01)

(58) Field of Classification Search
CPC .......... G06F 21/32; G06F 16/50; G07C 9/10; G07C 9/253; G07C 2209/12; G07C 9/38;
(Continued)

(56) References Cited

U.S. PATENT DOCUMENTS

2010/0134310 A1 6/2010 Zheng et al.
2015/0379254 A1* 12/2015 Matsuda ................ G06V 40/70
726/19
(Continued)

FOREIGN PATENT DOCUMENTS

JP 2008-158679 A 7/2008
JP 2010-108200 A 5/2010
(Continued)

OTHER PUBLICATIONS

International Search Report for PCT Application No. PCT/JP2018/039797, dated Jan. 22, 2019.
(Continued)

*Primary Examiner* — Jeffrey C Pwu
*Assistant Examiner* — Nega Woldemariam

(57) ABSTRACT

An authentication candidate extraction apparatus comprises a biometric information input part that receives biometric information of a to-be-authenticated subject, moving from a first spot to a second spot, acquired at the first spot; a feature information storage part that stores feature information used for authentication of the to-be-authenticated subject; a candidate selection part that selects a feature information candidate to be used for the authentication processing by means of a predetermined secure computation scheme using features extracted from the biometric information acquired at the first spot; and a feature information transmission part that transmits the extracted feature information candidate to an authentication apparatus that performs authentication processing using biometric information of the to-be-authenticated subject acquired at the second spot.

22 Claims, 14 Drawing Sheets

(51) Int. Cl.
*G07C 9/10* (2020.01)
*H04L 9/08* (2006.01)
*H04L 9/00* (2022.01)

(58) Field of Classification Search
CPC ........... G07C 9/37; H04L 9/085; H04L 9/008; H04L 9/3231; G06V 40/168; G06V 40/172; G06V 40/50; G06T 7/00; G09C 1/00
USPC .......................................................... 726/19
See application file for complete search history.

(56) References Cited

U.S. PATENT DOCUMENTS

2016/0371535 A1* 12/2016 Li ........................ G06V 40/161
2018/0019996 A1 1/2018 Morita et al.
2018/0139045 A1 5/2018 Furukawa et al.

FOREIGN PATENT DOCUMENTS

| | | |
|---|---|---|
| JP | 2010-128938 A | 6/2010 |
| JP | 2011-022641 A | 2/2011 |
| JP | 2018-049415 A | 3/2018 |
| WO | 2016/178291 A | 11/2016 |

OTHER PUBLICATIONS

English translation of Written opinion for PCT Application No. PCT/JP2018/039797, dated Jan. 22, 2019.
Okamura et al., "Enhancing FinTech Security with Secure Multi-Party Computation Technology", NEC Technical Journal, Mar. 31, 2017, vol. 69, No. 2, pp. 50-54.

* cited by examiner

FIG. 4

| USER ID | FACIAL FEATURE INFORMATION |
|---|---|
| xxxx0001 | <11,23,45...> |
| xxxx0002 | <23,14,55...> |
| xxxx0003 | <43,11,01...> |
| xxxx0004 | <10,23,33...> |
| xxxx0005 | <33,12,44...> |
| ... | ... |

AUTHENTICATION CANDIDATE EXTRACTION APPARATUS, AUTHENTICATION SYSTEM, AUTHENTICATION CANDIDATE EXTRACTION METHOD, AND PROGRAM

This application is a National Stage Entry of PCT/JP2018/039797 filed on Oct. 26, 2018, the contents of all of which are incorporated herein by reference, in their entirety.

TECHNICAL FIELD

The present invention relates to an authentication candidate extraction apparatus, authentication system, authentication candidate extraction method, and program.

BACKGROUND

Patent Literature 1 discloses a privacy protection system that provides privacy protection without causing concern to those who request the privacy protection. According to Patent Literature 1, the privacy protection system includes a request apparatus, a collation apparatus, and a published information providing apparatus. The request apparatus transmits first secret feature value data, in which the feature value data in an image of a person is kept secret, to the collation apparatus. The published information providing apparatus transmits second secret feature value data, in which the feature value data in a published image is kept secret, and an identifier that identifies the individual recognized in the published image to the collation apparatus. Patent Literature 1 states that the collation apparatus then collates the second secret feature value data with the first secret feature value data while maintaining the secrecy.

Patent Literature 2 discloses a secure computation data utilization system that can suppress or reduce an increase in a computation amount, a communication amount, and a transfer information amount when a database and a secure computation system are integrated. Patent Literature 2 also discloses a configuration that provides an intermediate apparatus that, upon reception of a request from an application apparatus, instructs a plurality of secure computation apparatuses to perform secure computation processing in accordance with the request. Patent Literature 2 further states that this intermediate apparatus performs a part of the operation indicated by the request on at least one of a part of data included in the request or data reconstructed from a plurality of shares received from the plurality of secure computation apparatuses.

Patent Literature 3 discloses an authentication apparatus capable of suppressing power consumption. According to Patent Literature 3, this portable authentication apparatus comprises a biometric information obtainment part (301) that acquires biometric information of a subject, a communication part that wirelessly communicates with a portable terminal apparatus carried by the subject, and a control part. Patent Literature 3 states that the control part is configured to perform authentication processing based on the obtained biometric information and to change the precision of the authentication processing based on the strength of a signal received from the terminal apparatus.

As secure computation methods in which data can be computed while it is encrypted, in addition to the secure circuit evaluation in Patent Literature 1 and the secret sharing scheme in Patent Literature 2, methods using homomorphic encryption are known.

[Patent Literature 1] Japanese Patent Kokai Publication No. JP-P2011-22641A
[Patent Literature 2] International Publication Number WO2016/178291
[Patent Literature 3] Japanese Patent Kokai Publication No. JP-P2018-49415A

SUMMARY

The following analysis is given by the present invention. As stated in Patent Literature 3, while identity authentication technologies using biometric information have become quite common in recent years, there is a demand to safely protect each individual's authentication data, which is private information, from information leakage and the like.

The secure computation methods of Patent Literatures 1 and 2 can be used to perform computation (collation) while safely protecting data, however, these methods generally have high computational and communication costs and therefore have a problem that it is difficult to obtain the required response performance.

For instance, in a case where authentication using face images is used at the ticket gate of a train station instead of commuter passes, using secure computation makes smooth ticket gate processing difficult due to a large number of passengers to be verified.

It is an object of the present invention to provide an authentication candidate extraction apparatus, authentication system, authentication candidate extraction method, and program capable of contributing to the protection of authentication data while ensuring high response performance as described above.

Solution to Problem

According to a first aspect, there is provided an authentication candidate extraction apparatus comprising a biometric information input part that receives biometric information of a to-be-authenticated subject, moving from a first spot to a second spot, acquired at the first spot; a feature information storage part that stores feature information used for authentication of the to-be-authenticated subject; a candidate selection part that selects a feature information candidate to be used for the authentication processing by means of a predetermined secure computation scheme using feature information extracted from the biometric information acquired at the first spot; and a feature information transmission part that transmits the selected feature information candidate to an authentication apparatus that performs authentication processing using biometric information of the to-be-authenticated subject acquired at the second spot.

According to a second aspect, there is provided an authentication system including the authentication candidate extraction apparatus; and an authentication apparatus comprising a biometric information input part that receives biometric information acquired at the second spot; and an authentication processing part that performs authentication processing using a feature information candidate received from the authentication candidate extraction apparatus and feature information extracted from the biometric information acquired at the second spot.

According to a third aspect, there is provided an authentication candidate extraction method including selecting a feature information candidate to be used for authentication processing by means of a predetermined secure computation scheme using feature information extracted from biometric information of a to-be-authenticated subject, moving from a first spot to a second spot, acquired at the first spot; and transmitting the selected feature information candidate to an authentication apparatus that performs authentication processing using biometric information of the to-be-authenticated subject acquired at the second spot. The present method is tied to a particular machine, namely a computer having the biometric information input part, the feature information storage part that stores feature information used for authentication of the to-be-authenticated subject, and a control part (processor) that can perform the processes described above.

According to a fourth aspect, there is provided a program executing a process of selecting a feature information candidate to be used for authentication processing by means of a predetermined secure computation scheme using features extracted from biometric information of a to-be-authenticated subject, moving from a first spot to a second spot, acquired at the first spot; and a process of transmitting the selected feature information candidate to an authentication apparatus that performs authentication processing using biometric information of the to-be-authenticated subject acquired at the second spot. Further, this program can be stored in a computer-readable (non-transitory) storage medium. In other words, the present invention can be realized as a computer program product.

According to the present invention, it becomes possible to achieve both the protection of authentication data and high response performance required for an authentication system.

BRIEF DESCRIPTION OF DRAWINGS

FIG. 4 is a drawing showing an example of feature information (before concealment processing) used in the first example embodiment of the present invention.

PREFERRED MODES

Figure 1:
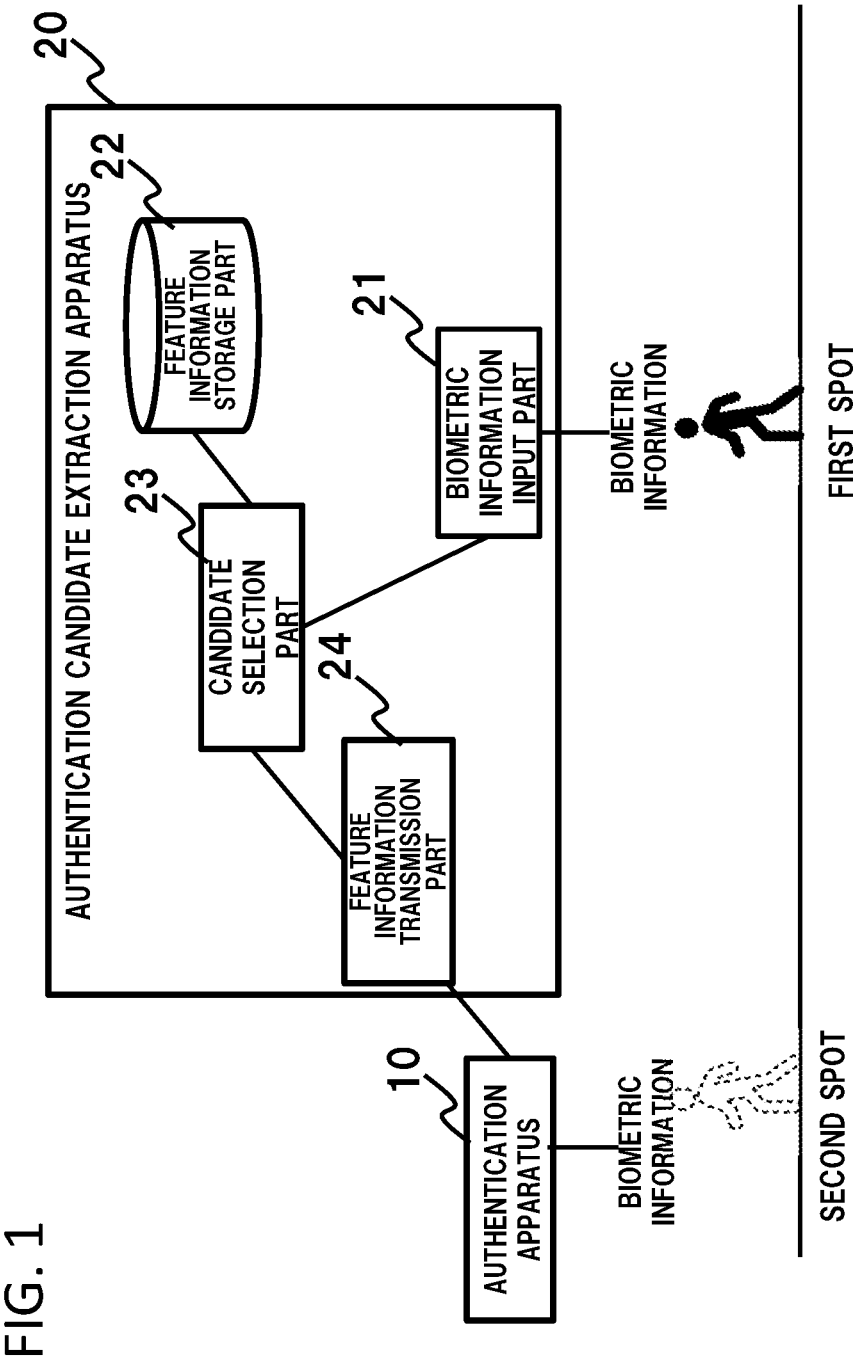
FIG. 1 is a drawing illustrating the configuration of an example embodiment of the present invention.

First, an outline of an example embodiment of the present invention will be given with reference to the drawings. It should be noted that the drawing reference signs in the outline are given to each element for convenience as an example to facilitate understanding and are not intended to limit the present invention to the illustrated aspects. Further, connection lines between blocks in the drawings referred to in the following description can be both bidirectional and unidirectional. A unidirectional arrow schematically shows the main flow of a signal (data) and does not exclude bidirectionality. Further, although the input/output connection points of each block in the drawings have ports or interfaces, these are not illustrated.

As shown in FIG. 1, the present invention in an example embodiment thereof can be realized by an authentication candidate extraction apparatus 20 comprising a biometric information input part 21, a feature information storage part 22, a candidate selection part 23, and a feature information transmission part 24.

More concretely, the biometric information input part 21 receives biometric information of a to-be-authenticated subject, moving from a first spot to a second spot (see the bottom of FIG. 1), acquired at the first spot. The feature information storage part 22 stores feature information used for authentication of the to-be-authenticated subject. For instance, when the to-be-authenticated subject is a passenger, the second spot is a location where the passenger's biometric information is acquired by a camera in front of the ticket gate at a station (see a camera 2 in FIG. 3). An authentication apparatus 10 performs authentication processing using the biometric information of the to-be-authenticated subject acquired at the second spot, determines whether or not the passenger is allowed to pass the gate, and controls the ticket gate of the station. Further, as the first spot, a place (platforms, passages, and stairs at the station) where passengers are likely to pass before arriving at the ticket gate at the station is selected (see a camera 1 in FIG. 3). Note that the above is merely an example, and the to-be-authenticated subject and the authentication apparatus are not limited to the passenger and ticket gate described above.

The candidate selection part 23 selects a feature information candidate to be used for the authentication processing by means of a predetermined secure computation scheme using a feature extracted from the biometric information acquired at the first spot. The number of feature information candidates used for authentication processing and extracted by the candidate selection part 23 may be determined based on the response performance required for the authentication apparatus 10.

Then, the feature information transmission part 24 transmits the extracted feature information candidate to the authentication apparatus that performs authentication processing using the biometric information of the to-be-authenticated subject acquired at the second spot. Therefore, the authentication apparatus 10 performs authentication processing on the candidate selected by the candidate selection part 23.

The authentication candidate extraction apparatus 20 described above is able to select a feature information candidate for the authentication processing and transmit the selected candidate to the authentication apparatus 10.

According to the configuration above, the authentication candidate extraction apparatus 20 selects a feature information candidate for authentication processing according to a predetermined secure computation method. Further, the number of feature information candidates referred to by the authentication apparatus 10 when performing authentication may be based on the response performance thereof. Therefore, according to the configuration above, it becomes possible to protect authentication data while ensuring high response performance.

First Example Embodiment

Figure 2:
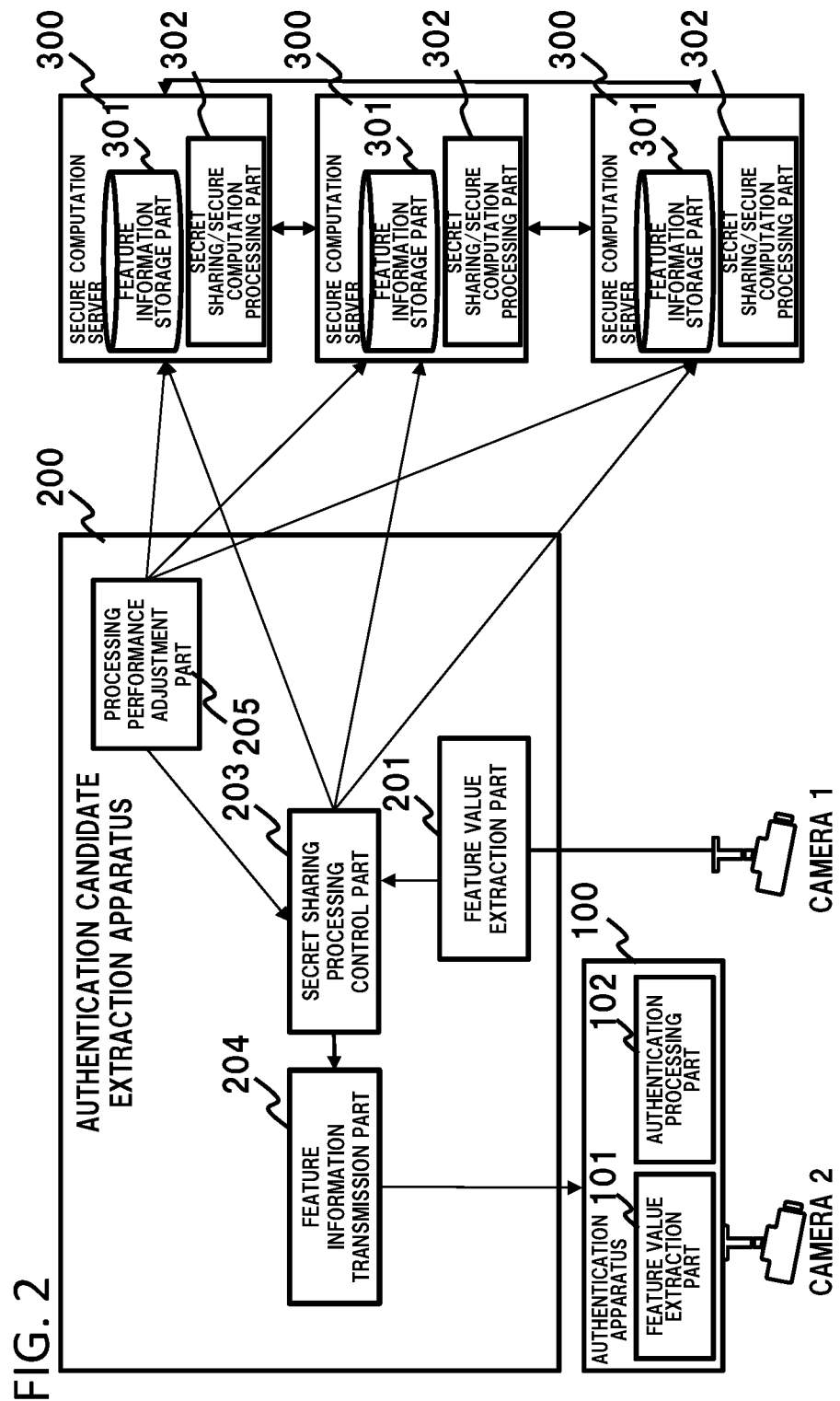
FIG. 2 is a drawing illustrating the configuration of an authentication system according to a first example embodiment of the present invention.

Next, a first example embodiment of the present invention, in which a person is assumed to be the to-be-authenticated subject, will be described in detail with reference to the drawings. FIG. 2 is a drawing illustrating the configuration of an authentication system according to the first example embodiment of the present invention. FIG. 2 shows a configuration that connects an authentication apparatus 100 with a camera 2 connected, an authentication candidate extraction apparatus 200 with a camera 1 connected, and a plurality of secure computation servers 300. The outline of the configuration of the first example embodiment is that the authentication candidate extraction apparatus 200 narrows down candidates and the authentication apparatus 100 performs authentication using the narrowed down candidates.

The authentication apparatus 100 collates a person captured by the camera 2 with feature information transmitted by the authentication candidate extraction apparatus 200. More concretely, the authentication apparatus 100 comprises a feature value extraction part 101 that receives biometric information acquired at a second spot, and an authentication processing part 102 that performs authentication processing using a feature information candidate received from the authentication candidate extraction apparatus 200 and feature information extracted from an image captured by the camera 2 installed at the second spot. Then, using the feature information transmitted by the authentication candidate extraction apparatus 200, the authentication apparatus 100 performs biometric authentication identifying a person in an image captured by the camera 2. Note that such a feature value extraction part 101 may be provided in the camera 2. In this case, the feature value extraction part 101 functions as the biometric information input part.

Further, the authentication apparatus 100 discards the feature information transmitted by the authentication candidate extraction apparatus 200 at a predetermined timing. Examples of this timing include when a person matching the feature information transmitted by the authentication candidate extraction apparatus 200 is successfully authenticated, and when the authentication apparatus 100 was not able to detect anyone matching the feature information transmitted by the authentication candidate extraction apparatus 200 after a predetermined period of time. As a result, the authentication apparatus 100 is prevented from storing private information (feature information) longer than necessary.

Further, in the following example embodiments, it is assumed that the feature information transmitted by the authentication candidate extraction apparatus 200 is information for facial recognition and that the authentication apparatus 100 performs facial recognition. As a matter of course, the scope of application of the present invention is not limited to facial recognition, and the present invention can be applied to authentication using other types of biometric information.

The authentication candidate extraction apparatus 200 comprises a feature value extraction part 201, a secret sharing processing control part 203, a feature information transmission part 204, and a processing performance adjustment part 205.

The feature value extraction part 201 cuts a person's face out of an image captured by the camera 1, extracts feature values thereof, constructs feature information by arranging the extracted feature values, and sends the feature information to the secret sharing processing control part 203. When the faces of multiple people appear in one image, the feature value extraction part 201 identifies the facial area of each person in the image and computes a plurality of feature information items. Note that such a feature value extraction part 201 may be provided in the camera 1. In this case, the feature value extraction part 201 functions as the biometric information input part.

The secret sharing processing control part 203 generates share information by means of secret sharing from the feature information received from the feature value extraction part 201, and instructs the secure computation server 300 to perform computation using the share information. More concretely, the secret sharing processing control part 203 instructs the secure computation server 300 to select a person with features similar to those of the person transmitted as the share information, i.e., a feature information candidate for authentication processing, from data of people held by each secure computation server 300.

Upon receiving the selection result (a feature information candidate for authentication processing) from the secure computation server 300, the secret sharing processing control part 203 instructs the feature information transmission part 204 to transmit the result to the authentication apparatus 100. Note that various methods for determining the number of candidates for authentication processing may be employed such as a method in which the maximum value that does not affect the response performance of the authentication apparatus 100 is selected, or one in which only candidates having similarities, calculated according to a predetermined calculation method, equal to or higher than a certain value are selected. Further, the secret sharing processing control part 203 may specify the number of candidates for authentication processing, having the secure computation server 300 extract the specified number of candidates for authentication processing.

Further, the secret sharing processing control part 203 may transmit the feature information extracted by the feature value extraction part 201 as feature information serving as a candidate for authentication processing transmitted to the authentication apparatus 100. This makes it possible to increase the accuracy of authentication using a person's clothes and hairstyle at the authentication apparatus 100.

Further, the secret sharing processing control part 203 may comprise a function of distributing a secure computation circuit (secure computation program) to be executed by the secure computation server 300.

The feature information transmission part 204 transmits to the authentication apparatus 100 the feature information candidate for authentication processing received from the secret sharing processing control part 203.

The processing performance adjustment part 205 adjusts the performance of secure computation processing performed by the secure computation server 300 to the extent that predetermined precision required for the authentication processing by the authentication apparatus 100 is satisfied. Concretely, the processing performance adjustment part 205 estimates the time it takes the camera 2 to capture a person after this person was captured by the camera 1, and adjusts the speed of the secure computation processing at the secure computation server 300 to be within that time. Note that the time it takes the camera 2 to capture a person after he or she was captured by the camera 1 may be calculated according to the distance between the cameras 1 and 2 and the average moving speed of pedestrians. Further, the average moving speed of pedestrians in each time period of the day may be used. When there are a plurality of paths between the cameras 1 and 2, the probability of these paths being taken may be taken into consideration in estimating the time lag. Further, when there are means of transportation between the cameras 1 and 2, such as escalators and moving walkways, the probability of these being used may be considered in calculating the time lag.

Figure 3:
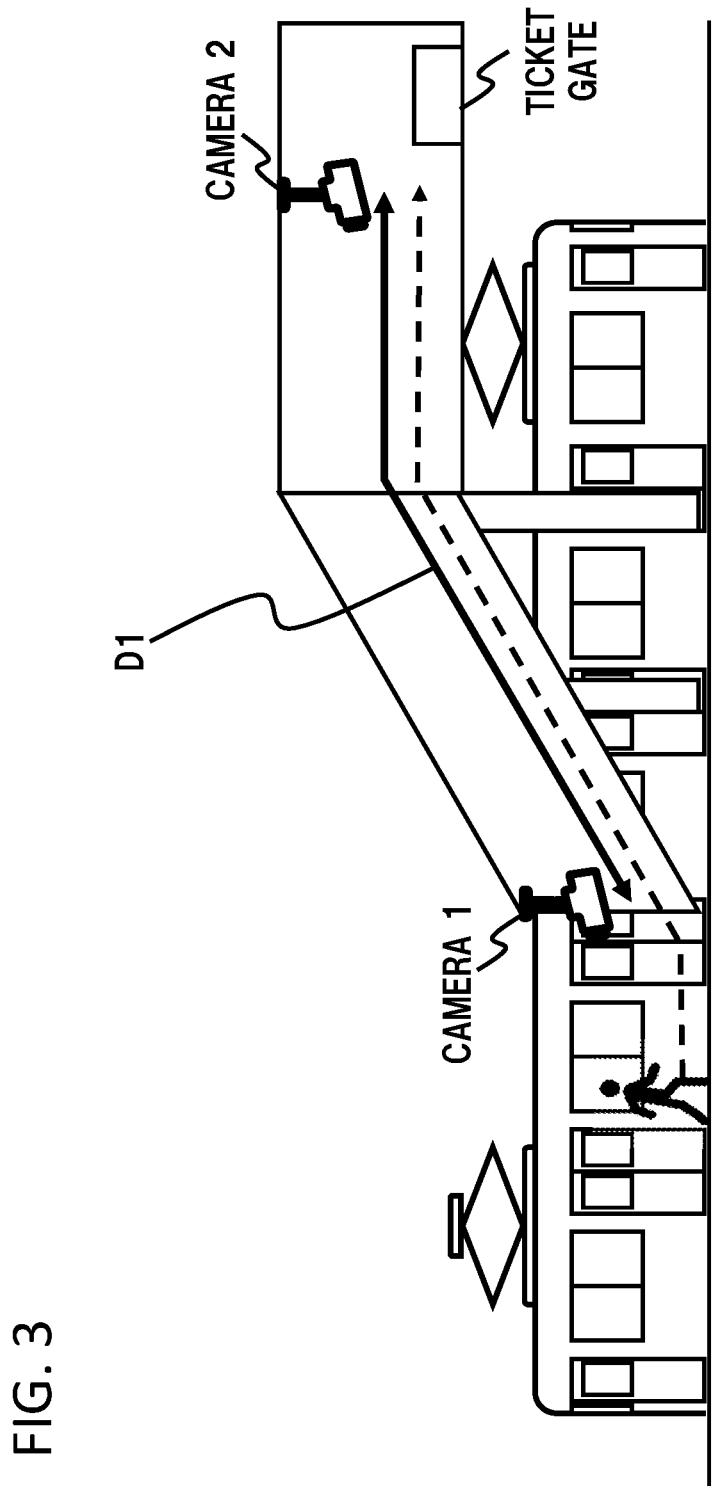
FIG. 3 is a drawing illustrating an example of how cameras are positioned in the first example embodiment of the present invention.

FIG. 3 is a drawing illustrating an example of how the cameras are positioned in the first example embodiment of the present invention. In this case, the processing performance adjustment part 205 is able to calculate the time it takes a person to be captured by the camera 2 after being captured by the camera 1 using a distance D1 between the cameras 1 and 2 and the average moving speed of pedestrians.

The speed of the secure computation processing may be adjusted by increasing/decreasing at the secure computation server 300 the number of digits of information elements (feature values) that constitutes the feature information used when a feature information candidate for authentication processing is extracted, or by increasing/decreasing the number of information elements (feature values) that constitutes the feature information, i.e., the number of elements collated.

Each secure computation server 300 comprises a feature information storage part 301 and a secret sharing/secure computation processing part 302.

The feature information storage part 301 holds feature information, protected by secret sharing, of a person who can be a subject of collation by the authentication apparatus 100. FIG. 4 is a drawing showing an example of the feature information (before concealment processing) used in the present example embodiment. The following description assumes that the feature information is a set of feature values (for instance, distances between feature points) of a person's face arranged in a predetermined order, such as <11, 23, 45, . . . >. Further, the following describes an example in which any of five users (IDs XXXX0001 to xxxx0005) shown in FIG. 4 is identified using facial recognition technology.

Following instructions from the secret sharing processing control part 203 and the processing performance adjustment part 205, the secret sharing/secure computation processing part 302 selects a person with features similar to those of the person transmitted as the share information, i.e., a feature information candidate for authentication processing, and sends the result to the secret sharing processing control part 203.

Therefore, in the present example embodiment, the secret sharing processing control part 203 and the secure computation server 300 function as the candidate selection part that sets the number of the feature information candidates for authentication processing so that the authentication apparatus 100 is able to complete authentication processing within a predetermined period of time.

Although the example in FIG. 2 shows three secure computation servers 300, the number of the secure computation servers 300 should be determined by the required processing speed and fault tolerance, and is not limited.

Figure 5:
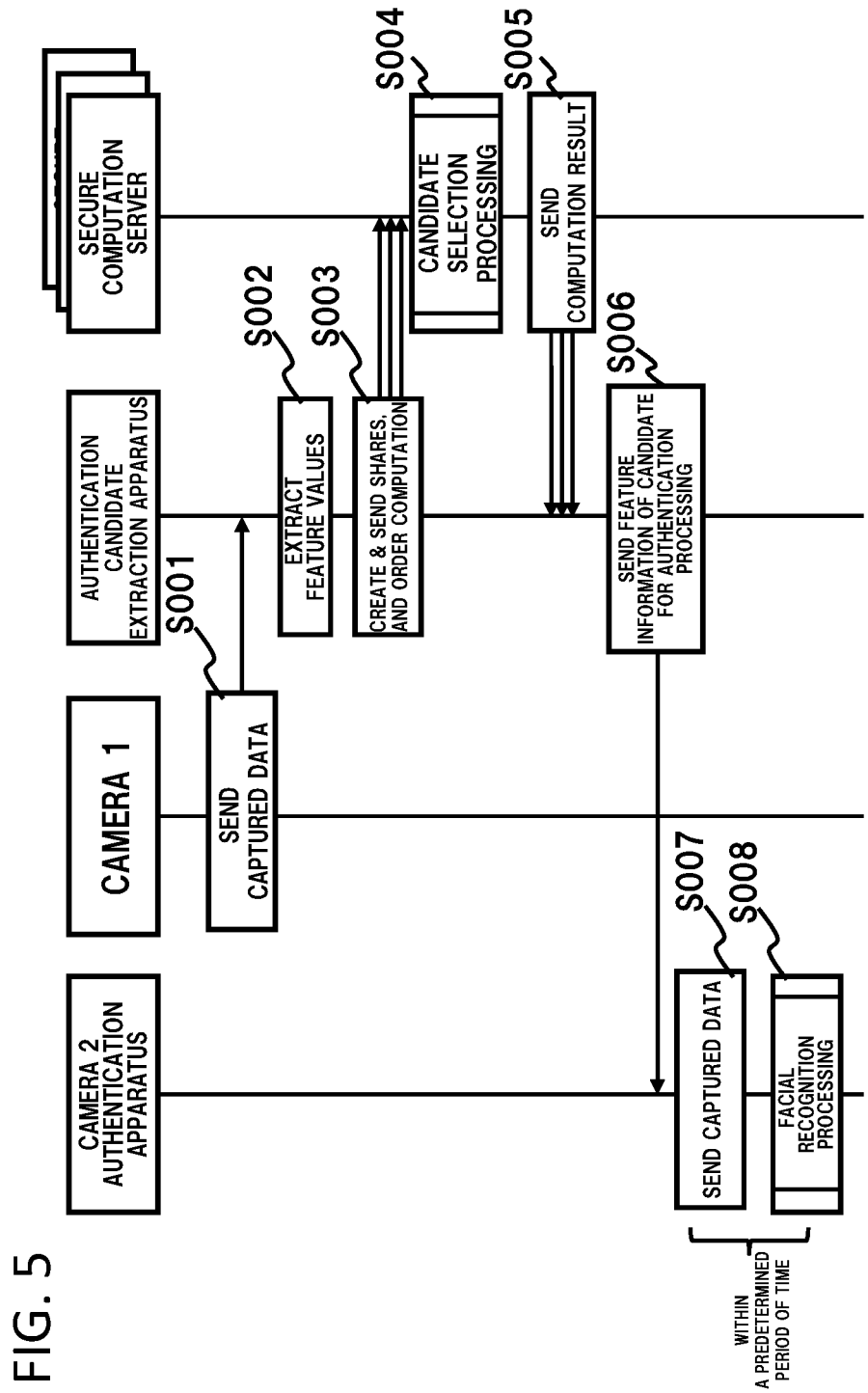
FIG. 5 is a sequence diagram illustrating the operation of the authentication system according to the first example embodiment of the present invention.

Next, the operation of the present example embodiment will be described in detail with reference to the drawings. FIG. 5 is a sequence diagram illustrating the operation of the authentication system according to the first example embodiment of the present invention. With reference to FIG. 5, the camera 1 first transmits captured data to the authentication candidate extraction apparatus 200 (step S001). Note that the camera 1 may transmit captured data to the authentication candidate extraction apparatus 200 each time it is able to recognize a person, or may repeatedly transmit captured data at predetermined time intervals, regardless of whether it recognizes a person.

Upon receiving the captured data, the authentication candidate extraction apparatus 200 extracts feature values from the face image of the person appearing in the captured data, and creates feature information (step S002).

Next, from the extracted feature information, the authentication candidate extraction apparatus 200 creates share information to be transmitted to the secure computation server 300, and transmits the share information to each secure computation server 300. Further, the authentication candidate extraction apparatus 200 instructs the secure computation server 300 to extract a candidate with features similar to those of the person transmitted (step S003: CREATE & SEND SHARES, AND ORDER COMPUTATION).

Upon receiving this instruction, the secure computation server 300 selects a candidate with features similar to those of the person captured by the camera 1 using the share information received from the authentication candidate extraction apparatus 200 (step S004). Then the secure computation server 300 transmits the computation result (the selection result) to the authentication candidate extraction apparatus 200 (step S005).

Upon receiving the selection result, using the information received from the secure computation server 300, the authentication candidate extraction apparatus 200 reconstructs feature information as a candidate for authentication processing and transmits the result to the authentication apparatus 100 (step S006).

In the step S006, instead of the feature information, reconstructed using the information received from the secure computation server 300, as a candidate for authentication processing, the authentication candidate extraction apparatus 200 may transmit feature information created from an image taken by the camera 1. In this case, the feature information created from an image taken by the camera 1 is identified based on the feature information candidate for authentication processing reconstructed using the information received from the secure computation server 300. Further, in the step S005, instead of selecting a candidate with similar features, whether or not there is a person deemed to be the same as the person captured by the camera 1 may be determined. This allows the facial recognition processing at the authentication apparatus 100 to be one-to-one authentication, reducing the computational cost.

Meanwhile, the camera 2 transmits captured data to the authentication apparatus 100 (step S007). Then, within a predetermined period of time, the authentication apparatus 100 performs facial recognition on the face of the person captured by the camera 2 using the feature information candidate for authentication processing received from the authentication candidate extraction apparatus 200 (step S008).

Figure 6:
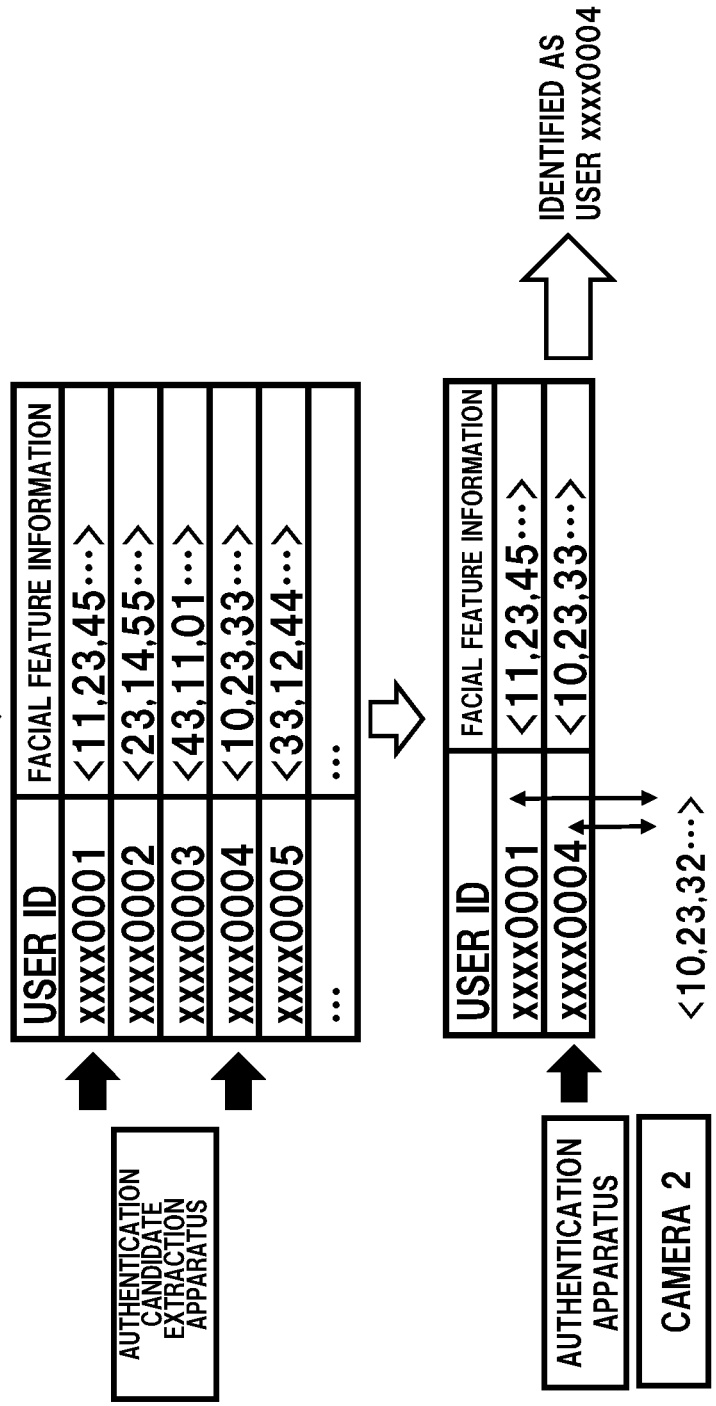
FIG. 6 is a drawing for explaining the operation of the authentication system according to the first example embodiment of the present invention.

The effects of the authentication system above will be described in detail with reference to the drawings. FIG. 6 is a drawing for explaining the operation of the authentication system according to the first example embodiment of the present invention. The following describes an example in which the cameras 1 and 2 capture a person with feature information <10, 23, 33, . . . >, as shown in FIG. 6.

When the camera 1 installed at the first spot captures this person, the authentication candidate extraction apparatus 200 extracts the feature information <10, 23, 33, . . . > and instructs the secure computation server 300 to select a candidate for authentication processing.

Upon receiving the instruction, for instance, the secure computation server 300 selects a user of ID xxxx0001 having feature information <11, 23, 45, . . . > and a user of ID xxxx0004 having the feature information <10, 23, 33, . . . >, as shown in FIG. 6. Then the authentication candidate extraction apparatus 200 transmits the feature information of the user IDs xxxx0001 and xxxx0004 to the authentication apparatus 100. As a result, the number of person checked by the authentication apparatus 100 is reduced from five to two.

The authentication apparatus 100 collates the feature information <10, 23, 33, . . . > extracted from an image captured by the camera 2 with the feature information of the user IDs xxxx0001 and xxxx0004, and selects the one with a higher similarity. In the example of FIG. 6, the authentication apparatus 100 determines that the person captured by the camera 2 is the user of ID xxxx0004. As described above, the number of people checked by the authentication apparatus 100 is at most two, the authentication apparatus 100 is able to authenticate a person captured by the camera 2 within the required response time.

Second Example Embodiment

Figure 7:
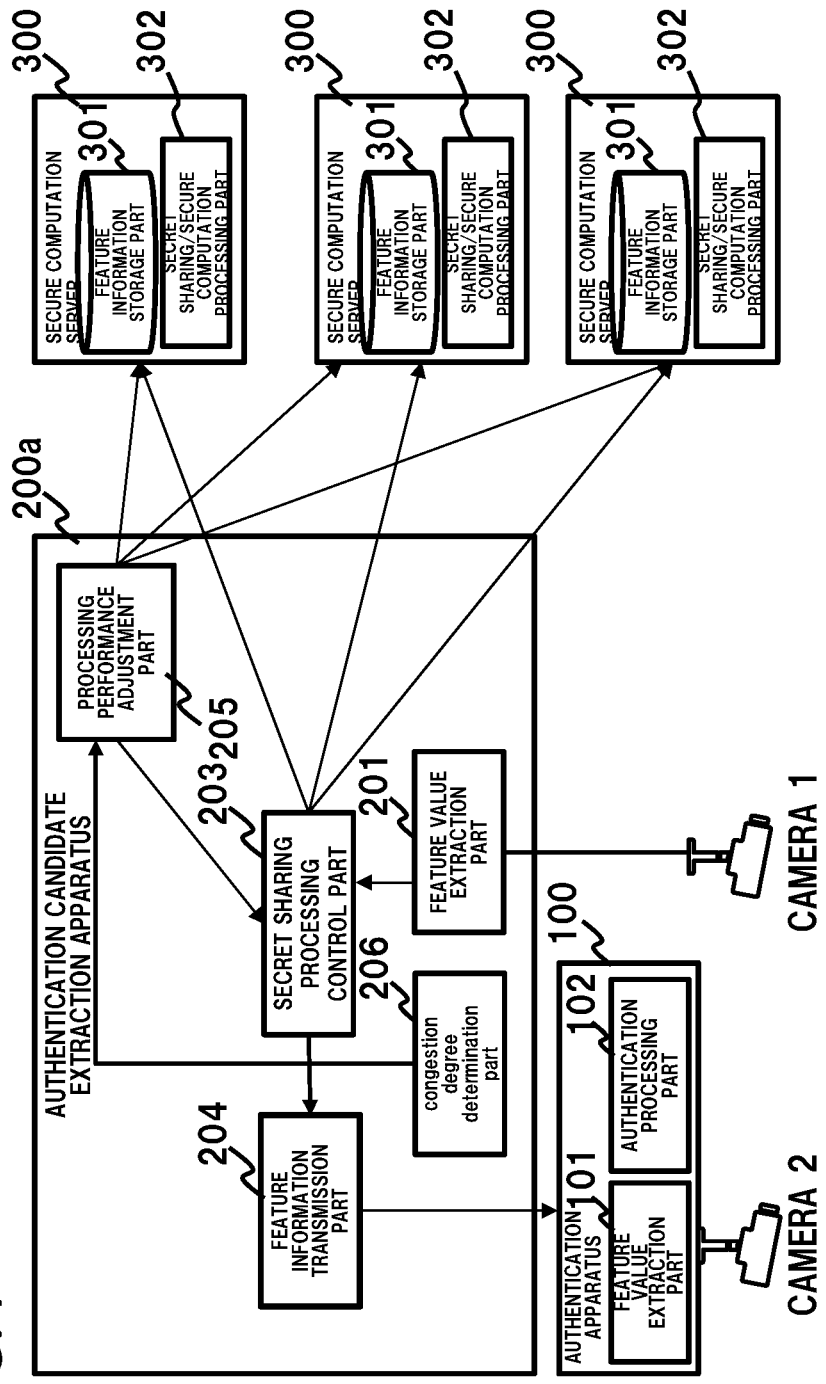
FIG. 7 is a drawing illustrating the configuration of an authentication system according to a second example embodiment of the present invention.

Next, with reference to the drawings, the following describes in detail a second example embodiment, in which the processing speed of the secure computation server 300 is adjusted according to how congested it is between the cameras 1 and 2. FIG. 7 is a drawing illustrating the configuration of an authentication system according to the second example embodiment of the present invention. This configuration differs from the one shown in FIG. 2 in that a congestion degree determination part 206 is added to an authentication candidate extraction apparatus 200a. Since the second example embodiment is otherwise configured identically to the first example embodiment, the following will mainly discuss the differences.

The congestion degree determination part 206 determines the congestion degree according to the number of faces extracted by the feature value extraction part 201 from an image captured by the camera 1, and transmits the result to the processing performance adjustment part 205. For instance, when faces not fewer than a predetermined threshold value appear in a single image, the congestion degree determination part 206 determines that the congestion degree is high and transmits congestion information (the congestion degree=high) to the processing performance adjustment part 205 (refer to FIG. 8). In the example of FIG. 7, the congestion degree determination part 206 determines the congestion degree based on the information acquired from the feature value extraction part 201, however, the congestion degree determination part 206 may be connected to a separate camera and measure the congestion degree independently of the feature value extraction part 201.

Upon receiving the congestion degree information (the congestion degree=high), the processing performance adjustment part 205 anticipates that the time it takes the camera 2 to capture the person captured by the camera 1 will be longer than normal. Then, the processing performance adjustment part 205 adjusts the speed of the secure computation processing at the secure computation server 300 according to this time period.

Figure 8:
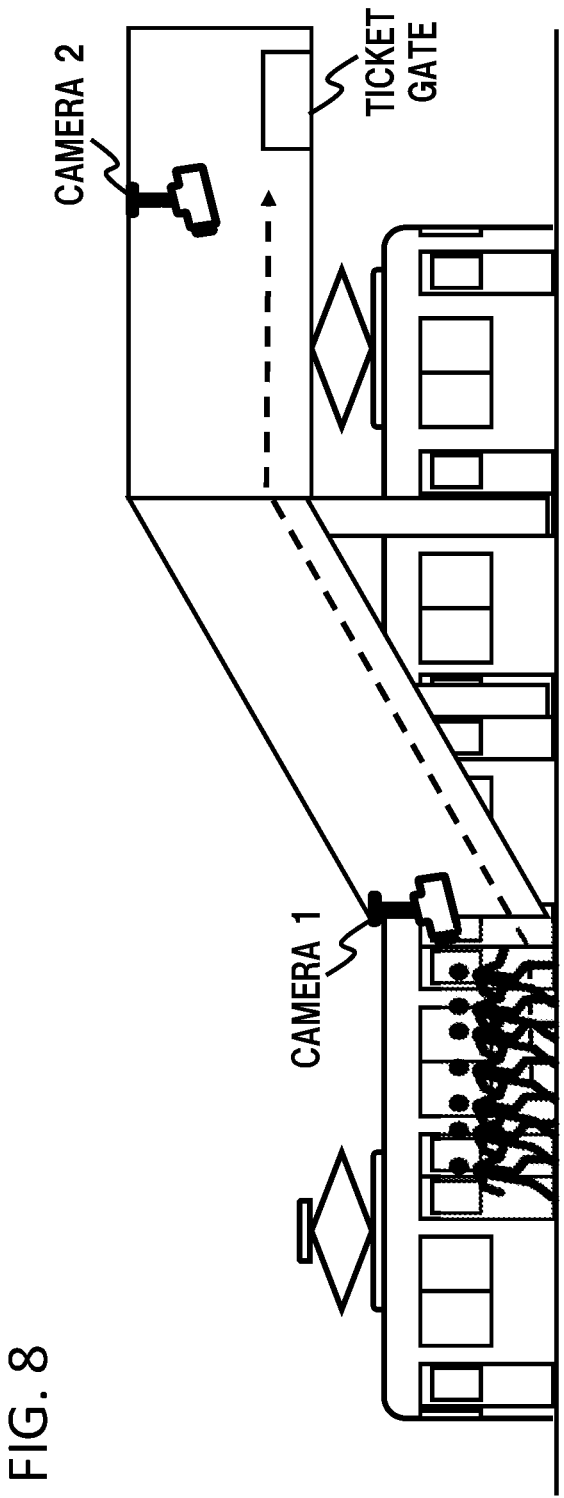
FIG. 8 is a drawing illustrating an example in which it takes time for a to-be-authenticated subject to move from the camera 1 to the camera 2.

For instance, as shown in FIG. 8, in a case where it is crowded in front of the stairs and the camera 1 captures many people, the time it takes the people captured by the camera 1 to move to the location of the camera 2 will be longer than when not crowded since many passengers head for the ticket gate after getting off the train. In this case, the secure computation server 300 is given more time for the processing, therefore the processing performance adjustment part 205 instructs the secure computation server 300 to select a candidate using a calculation method that takes longer than usual but is highly accurate. For instance, the processing performance adjustment part 205 instructs the secure computation server 300 to perform more accurate candidate selection by increasing the number of digits of feature values that was normally reduced or increasing the number of feature values used for collation. Further, in addition to these instructions, the processing performance adjustment part 205 may instruct the secure computation server 300 to narrow down the number of candidates or raise the threshold value for similarity determination.

Figure 9:
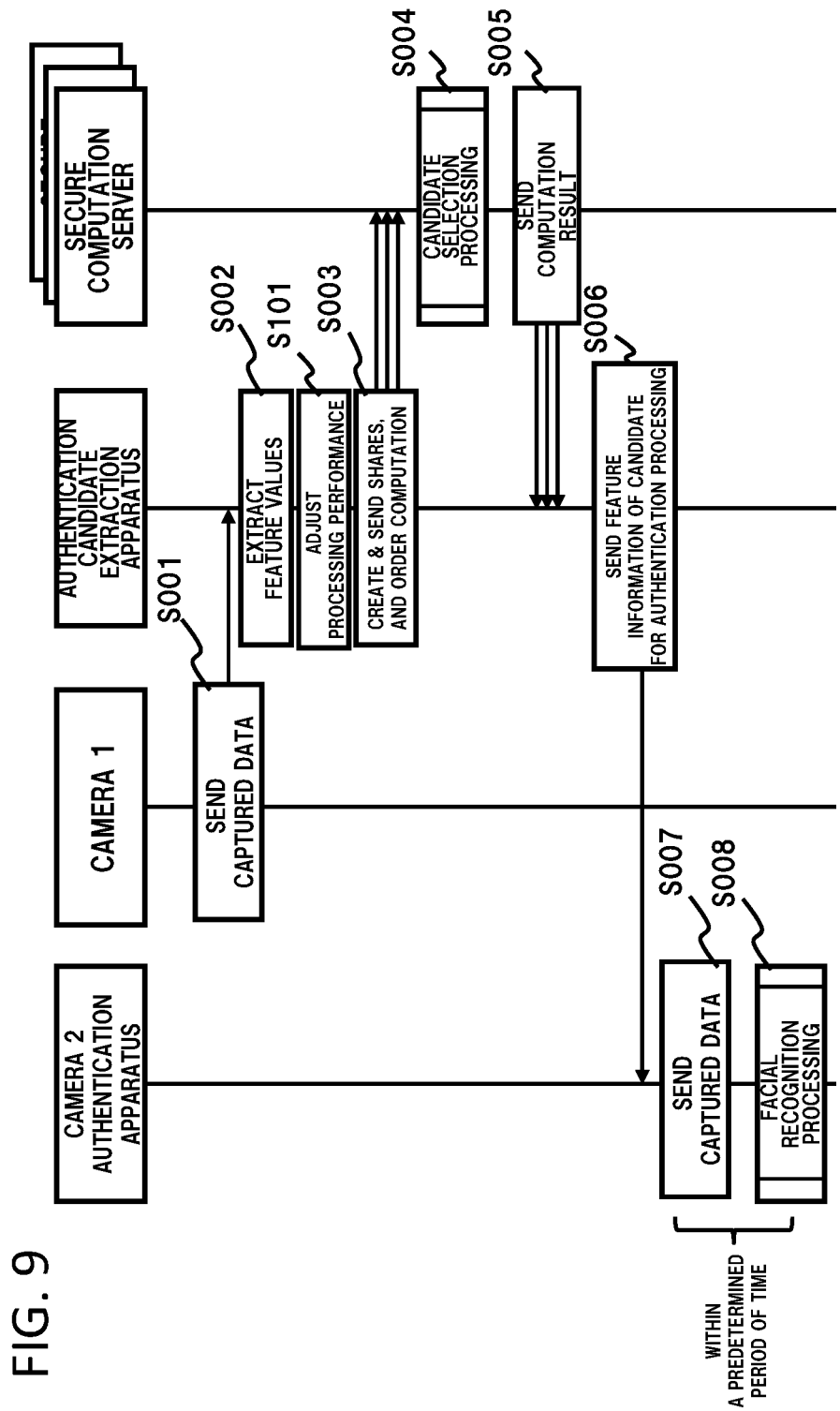
FIG. 9 is a sequence diagram illustrating the operation of the authentication system according to the second example embodiment of the present invention.

Next, the operation of the present example embodiment will be described in detail with reference to the drawings. FIG. 9 is a sequence diagram illustrating the operation of the authentication system according to the second example embodiment of the present invention. This diagram differs from the first example embodiment shown in FIG. 5 in that a processing performance adjustment process according to the congestion degree (step S101) is added after the step S002 "EXTRACT FEATURE VALUES." Since the other processes are the same as those in the first example embodiment, the description thereof will be omitted.

Figure 10:
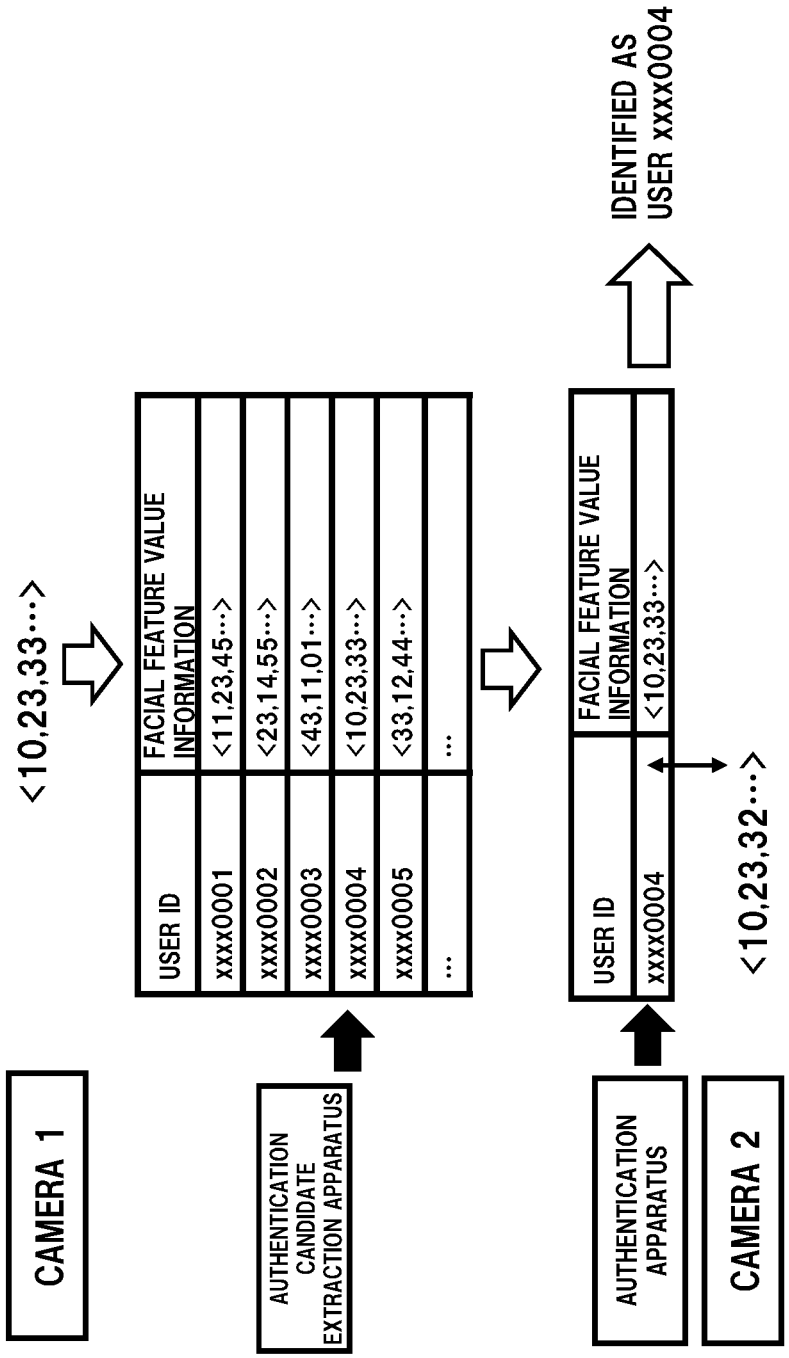
FIG. 10 is a drawing for explaining the operation of the authentication system according to the second example embodiment of the present invention.

The effects of the example embodiment above will be described in detail with reference to the drawings. FIG. 10 is a drawing for explaining the operation of the authentication system according to the second example embodiment of the present invention. The following describes an example in which the cameras 1 and 2 capture a person with the feature information <10, 23, 33, . . . >, as shown in FIG. 10.

When the camera 1 installed at the first spot captures this person, the authentication candidate extraction apparatus 200 extracts the feature information <10, 23, 33, . . . > and instructs the secure computation server 300 to select a candidate for authentication processing. At this time, the authentication candidate extraction apparatus 200 instructs the secure computation server 300 to increase the processing performance.

Upon receiving the instruction, for instance, the secure computation server 300 selects the user of ID xxxx0004 having the feature information <10, 23, 33, . . . >, as shown in FIG. 10. Then the authentication candidate extraction apparatus 200 transmits the feature information of the user ID xxxx0004 to the authentication apparatus 100. As a result, the number of people checked by the authentication apparatus 100 is reduced from five to one.

The authentication apparatus 100 collates the feature information <10, 23, 33, . . . > extracted from an image captured by the camera 2 with the feature information of the user ID xxxx0004, and if the similarity is equal to or higher than a predetermined value, the authentication apparatus 100 determines that the user of ID xxxx0004 has arrived at the spot of the camera 2. Since the authentication apparatus 100 checks only one person in this case, the authentication apparatus 100 is able to perform authentication even faster than in the first example embodiment.

In the example above, the secure computation server 300 is instructed to increase the processing performance at the time of congestion, however, the processing performance may normally be set to a high level and be decreased when there is no congestion.

As described above, according to the present example embodiment, it becomes possible to adjust the processing speed of the secure computation server 300 according to the degree of congestion between the cameras 1 and 2, thereby optimizing the processing time at the authentication apparatus 100. As illustrated in FIG. 10, the present example embodiment in particular can be suitably applied to the ticket gate system at a train station. For instance, since weekday mornings and evenings have a high degree of congestion with a large number of passengers and their moving speed slows down according to the congestion degree, one is able to further narrow down feature information while taking the slow-moving speed into consideration.

Further, in the example embodiment described above, the congestion degree is determined by counting the number of people's faces cut out of an image captured by the camera 1, however, when the congestion degree of each day of the week and each time of the day is already known, estimated congestion degrees using date and time information may be used. Further, the congestion degree may be calculated using both the number of people's faces cut out of an image captured by the camera 1 and the date and time information.

Further, adjusting the speed of the secure computation processing according to the congestion degree is merely an example, and the moving speed of each person may not change greatly even with a high congestion degree, depending on the structure of the station. Conversely, the moving speed of each person may change a great deal when it gets somewhat crowded. More preferably, it is also possible to employ a method for appropriately adjusting the performance according to the actual moving speed of each person and the congestion degree obtained in the latest authentication processing.

Third Example Embodiment

Figure 11:
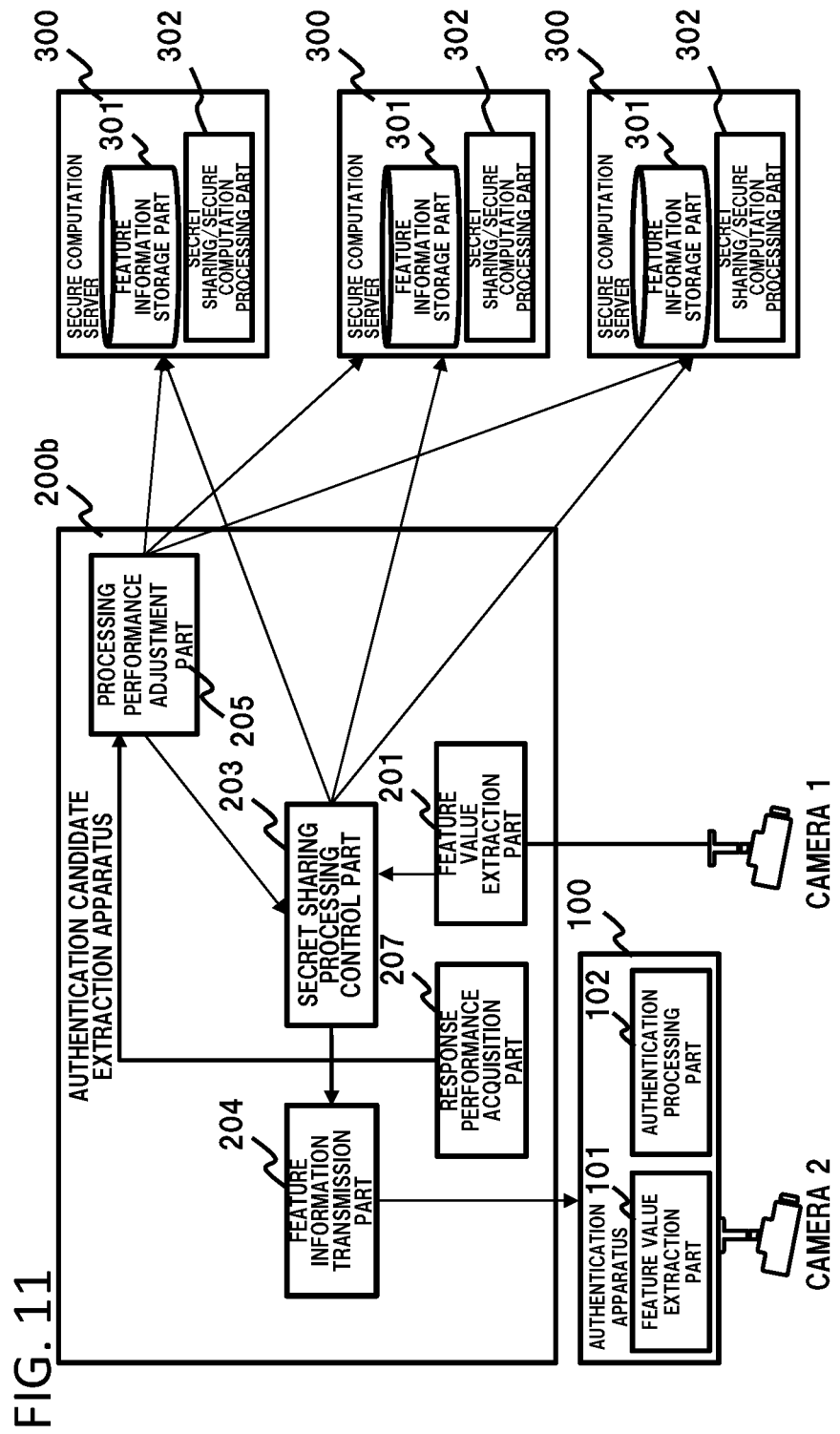
FIG. 11 is a drawing illustrating the configuration of an authentication system according to a third example embodiment of the present invention.

Next, with reference to the drawings, the following describes in detail a third example embodiment, in which the processing performance of the secure computation server 300 is adjusted according to the response performance of the authentication processing at the authentication apparatus 100. FIG. 11 is a drawing illustrating the configuration of an authentication system according to the third example embodiment of the present invention. This configuration differs from the one shown in FIG. 2 in that a response performance acquisition part 207 is added to an authentication candidate extraction apparatus 200b. Since the third example embodiment is otherwise configured identically to the first example embodiment, the following will mainly discuss the differences.

The response performance acquisition part 207 obtains from the authentication apparatus 100 as the response performance the average response time from when feature information is transmitted to the authentication apparatus 100 until the result thereof is obtained. Then the response performance acquisition part 207 transmits the acquired response performance to the processing performance adjustment part 205.

When the average response time is longer than a predetermined target response time (threshold 1), the processing performance adjustment part 205 adjusts the speed of the secure computation processing at the secure computation server 300 so that the response time at the authentication apparatus 100 is reduced. Further, when the average response time is shorter than a predetermined target response time (threshold 2 where threshold 1 threshold 2), the processing performance adjustment part 205 adjusts the processing performance at the secure computation server 300 so that the response time at the authentication apparatus 100 increases.

Figure 12:
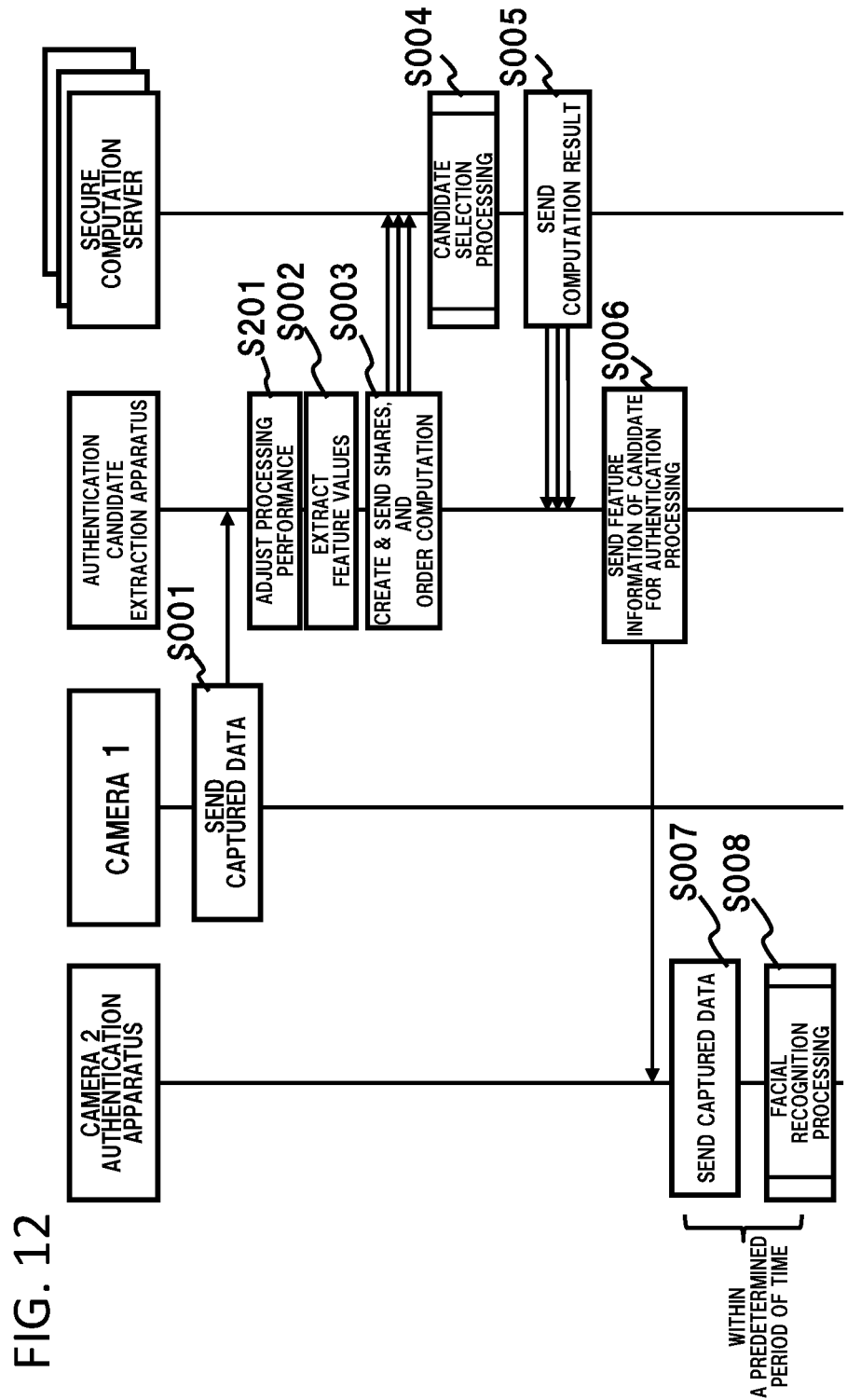
FIG. 12 is a sequence diagram illustrating the operation of the authentication system according to the third example embodiment of the present invention.

Next, the operation of the present example embodiment will be described in detail with reference to the drawings. FIG. 12 is a sequence diagram illustrating the operation of the authentication system according to the third example embodiment of the present invention. This diagram differs from the first example embodiment shown in FIG. 5 in that a processing performance adjustment process according to the response performance of the authentication apparatus 100 (step S201) is added before the step S002 "EXTRACT FEATURE VALUES." Since the other processes are the same as those in the first example embodiment, the description thereof will be omitted.

Figure 13:
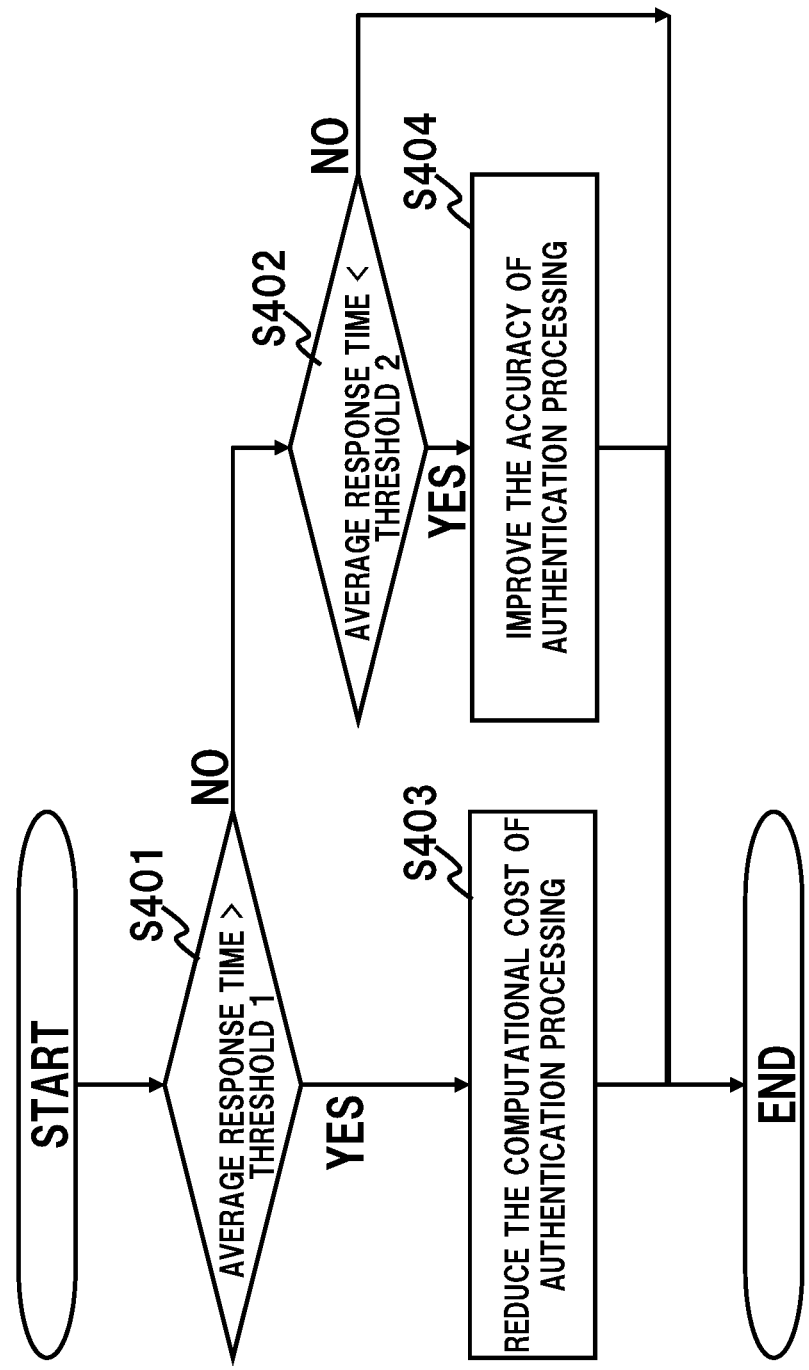
FIG. 13 is a flowchart illustrating how a processing performance adjustment process is performed by an authentication candidate extraction apparatus according to the third example embodiment of the present invention.

FIG. 13 is a flowchart illustrating the processing performance adjustment process performed by the authentication candidate extraction apparatus 200b. With reference to FIG. 13, for instance, when the average response time is longer than a predetermined target response time (threshold 1) (YES in step S401), the authentication candidate extraction apparatus 200b instructs the secure computation server 300 to change the candidate selection processing so that the computational cost of the authentication processing at the authentication apparatus 100 is reduced. For instance, the processing performance adjustment part 205 instructs the secure computation server 300 to perform more precise candidate extraction by increasing the number of digits of feature values used in the candidate selection processing or increasing the number of feature values used for collation. As in the second example embodiment, this reduces the number of people checked by the authentication apparatus 100, thereby shortening the response time at the authentication apparatus 100. As a result, it becomes possible to prevent a processing delay at the authentication apparatus 100.

On the other hand, when the average response time is shorter than a predetermined target response time (threshold 2) (YES in step S402), the processing performance adjustment part 205 recognizes that the authentication apparatus 100 has some processing capacity to spare. In this case, the processing performance adjustment part 205 levels the processing performance of the authentication apparatus 100 and the secure computation server 300 by decreasing the number of digits of feature values used in the candidate selection processing at the secure computation server 300 or reducing the number of feature values used for collation. As a result, it becomes possible to optimize the time period during which the authentication apparatus 100 retains the feature information. Meanwhile, the process described above will increase the number of people checked by the authentication apparatus 100, thereby increasing the response time thereof, however, this will not be a problem as long as the response time is within the time it takes a person to move from the first spot to the second spot.

As described above, according to the present example embodiment, it becomes possible to optimize the speed of the secure computation processing at the secure computation server 300 according to the response performance of the authentication apparatus 100.

In the example embodiment described above, the average response time is used as the index of the response performance of the authentication processing at the authentication apparatus 100, however, the maximum response time or the median value or mode of the response time may be used instead of the average response time.

While each example embodiment of the present invention has been described, it is to be understood that the present invention is not limited to the example embodiment above and that further modifications, replacements, and adjustments may be added without departing from the basic technical concept of the present invention. For instance, the configuration of each element and the configuration of information shown in each drawing are examples to facilitate understanding of the present invention and are not limited to the configurations shown in the drawings. Further, in the following description, "A and/or B" means at least one of A and B. Also, although the input/output connection points of each block in the drawings have ports or interfaces, these are omitted.

For instance, in the example embodiments described above, facial feature data is used as information identifying a to-be-authenticated subject, however, the present invention can be applied to authentication using biometric information other than facial feature data. For instance, authentication candidates may be narrowed down by installing the camera 1 at the entrance of a corporation, and candidates for authentication processing may be transmitted to the authentication apparatus 100 that performs iris recognition using the camera 2 installed at a security area within the company.

For instance, in the example embodiments described above, a server that performs secure computation using a secret sharing scheme is used as the secure computation server, however, a server that performs secure computation using homomorphic encryption or fully homomorphic encryption may also be used.

Further, in the example embodiments described above, the performance of the authentication processing candidate extraction is adjusted by varying the speed of the secure computation processing at the secure computation server 300, however, the method for adjusting the performance of the authentication processing candidate extraction is not limited thereto. For instance, the secure computation scheme may be changed, or the processing scheme (algorithm and parameters) using a secret sharing scheme at the secure computation server 300 may be changed. Further, one may provide a plurality of groups of the secure computation servers 300, letting each of them share the responsibility of the authentication processing candidate extraction and perform more accurate candidate extraction.

Further, a secure computation scheme may be used as the authentication processing at the authentication apparatus 100 of the example embodiments described above.

Further, in the example embodiments described above, the processing performance of the secure computation server 300 is adjusted based on the congestion degree captured by the camera 1 or the response performance of the authentication apparatus 100, however, the processing performance of the secure computation server 300 may be adjusted using other parameters. For instance, the qualities of images captured by the camera 1 differ in the face orientation, facial expression, complexion, brightness (depending on the shooting time), etc., and these qualities can vary depending on the shooting time, the face orientation, the distance between the camera and the subject, etc. The number of digits of feature values included in the feature information used for the selection of candidates for the authentication processing or the number of feature values may be increased/decreased according to these qualities of an image captured by the camera 1. For instance, if the image of a to-be-authenticated subject in an image captured by the camera 1 is coarse, the accuracy of the candidate selection performed by the secure computation server 300 will suffer. In this case, the processing performance adjustment part 205 may decrease the number of digits of feature values in the candidate selection processing or decrease the number of feature values used for collation to the extent that the accuracy of the candidate selection at the secure computation server 300 is not affected. As a result, the computational resources of the secure computation server 300 can be used for the extraction of candidates for other authenticated subjects.

Further, in the example embodiments described above, the authentication candidate extraction apparatus 200 extracts a candidate for authentication processing using a face image captured by the camera 1, however, candidates for authentication processing may be narrowed down using information other than a face image captured by the camera 1. For instance, when it is possible to infer at which station a passenger will get off from the commuter pass or ticket information, candidates for authentication processing may be narrowed down using these pieces of information.

Further, in the example embodiments described above, the second spot is near the ticket gate and the first spot is a passage or stairs leading up to the ticket gate, however, the combination of the first and the second spots is not limited thereto. For instance, the present invention may be applied to entry/exit management at a building or event venue, or entry/exit management or border control at a port or airport. Further, in the example embodiments described above, the second spot is near the ticket gate with the assumption that passengers exit therefrom, however, the present invention can be applied to a case where passengers enter from the ticket gate. In this case, the second spot is near an entrance ticket gate and a passage or stairs leading up to the ticket gate is selected as the first spot.

Figure 14:
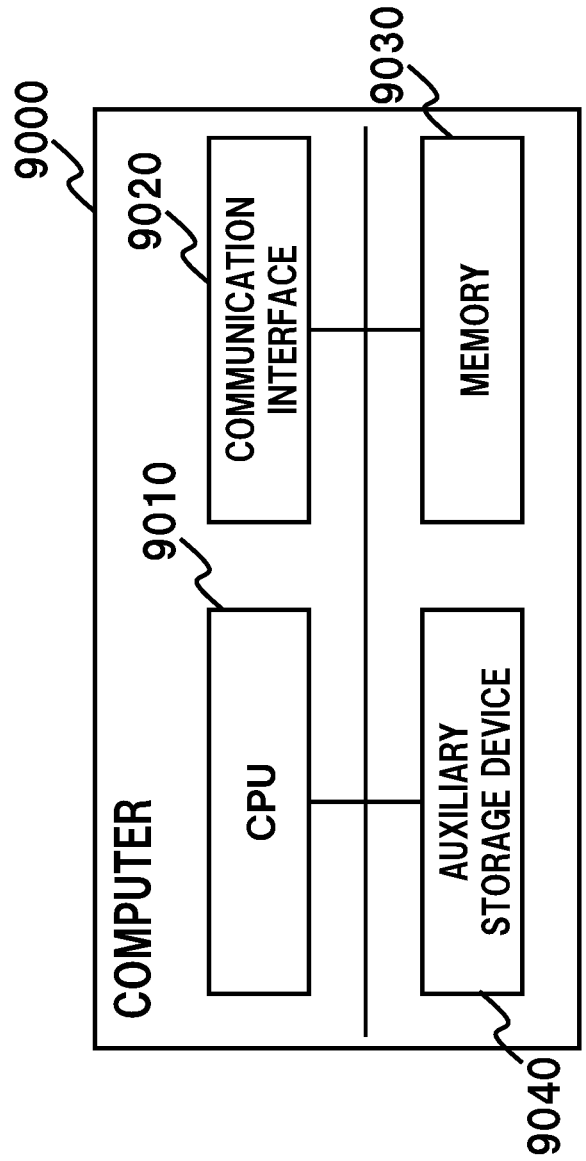
FIG. 14 is a drawing illustrating the configuration of a computer constituting the authentication candidate extraction apparatus according to the present invention.

Further, the procedures described in the first to the third example embodiments can be implemented by a program causing a computer (9000 in FIG. 14) that functions as the authentication candidate extraction apparatuses 200, 200*a*, and 200*b* to realize the functions of the authentication candidate extraction apparatus. FIG. 14 illustrates such a computer configured to comprise a CPU (Central Processing Unit) 9010, a communication interface 9020, a memory 9030, and an auxiliary storage device 9040. In other words, the CPU 9010 in FIG. 14 executes a feature values extraction program and a secret sharing processing control program, updating each calculation parameter held by the auxiliary storage device 9040.

In other words, each part (processing means, function) of the authentication candidate extraction apparatuses 200, 200*a*, and 200*b* described in the first to the third example embodiments can be realized by a computer program causing a processor installed in these apparatuses to execute each of the processes described above using the hardware thereof.

Finally, preferred modes of the present invention will be summarized.

[Mode 1]
(Refer to the authentication candidate extraction apparatus according to the first aspect.)

[Mode 2]
In the authentication candidate extraction apparatus, it is preferred that the biometric information be a face image captured by cameras installed at each of the first and the second spots.

[Mode 3]
In the authentication candidate extraction apparatus, the second spot may be a spot in front of the ticket gate at a train station, and the authentication apparatus may be configured to control the ticket gate of the station.

[Mode 4]
In the authentication candidate extraction apparatus, the candidate selection part may be configured to set the number of feature information candidates for the authentication processing so that the authentication apparatus completes authentication processing within a predetermined period of time.

[Mode 5]
In the authentication candidate extraction apparatus, the feature information transmission part may be configured to transmit feature information extracted from the biometric information acquired at the first spot as the feature information candidate for the authentication processing.

[Mode 6]
The authentication candidate extraction apparatus may be configured to convert features extracted from the biometric information acquired at the first spot into share information by means of secret sharing, transmit the share information to predetermined secret sharing servers, reconstruct feature information serving as the candidate for the authentication processing based on information received from the predetermined secret sharing servers, and transmit the reconstructed feature information as the feature information candidate for the authentication processing.

[Mode 7]
The authentication candidate extraction apparatus may be configured to further comprise a processing performance adjustment part that adjusts the performance of the candidate selection process for the authentication processing based on the estimated time it takes the to-be-authenticated subject to reach the second spot from the first spot so that a candidate satisfying predetermined required accuracy can be extracted.

[Mode 8]
In the authentication candidate extraction apparatus, the processing performance adjustment part may be configured to calculate the estimated time based on at least one of distance between at least the first spot and the second spot and the degree of congestion between the first and the second spots.

[Mode 9]
In the authentication candidate extraction apparatus, the biometric information acquired at the first spot is a face image of the to-be-authenticated subject, and the processing performance adjustment part may be configured to adjust the performance of the candidate selection process according to quality of the image.

[Mode 10]
In the authentication candidate extraction apparatus, the processing performance adjustment part may be configured to adjust the performance of the candidate selection process according to response time of the authentication processing of the authentication apparatus.

[Mode 11]
In the authentication candidate extraction apparatus, the processing performance adjustment part may be configured to adjust the performance of the candidate selection process for the authentication processing by increasing/decreasing number of digits of feature values included in feature information used for the extraction of a candidate for the authentication processing or number of feature values.

[Mode 12]
(Refer to the authentication system according to the second aspect.)

[Mode 13]
(Refer to the authentication candidate extraction method according to the third aspect.)

[Mode 14]
(Refer to the program according to the fourth aspect.)

Further, like Mode 1, Modes 12 to 14 can be developed into Modes 2 to 11.

Further, each disclosure of Patent Literatures cited above is incorporated herein in its entirety by reference thereto. It is to be noted that it is possible to modify or adjust the example embodiments or examples within the whole disclosure of the present invention (including the Claims) and based on the basic technical concept thereof. Further, it is possible to variously combine or select (or partially delete) a wide variety of the disclosed elements (including the individual elements of the individual claims, the individual elements of the individual example embodiments or examples, and the individual elements of the individual figures) within the scope of the disclosure of the present invention. That is, it is self-explanatory that the present invention includes any types of variations and modifications to be done by a skilled person according to the whole disclosure including the Claims, and the technical concept of the present invention. Particularly, any numerical ranges disclosed herein should be interpreted that any intermediate values or subranges falling within the disclosed ranges are also concretely disclosed even without specific recital thereof.

SIGNS LIST 10, 100: authentication apparatus
20, 200, 200a, 200b: authentication candidate extraction apparatus
21: biometric information input part
22, 301: feature information storage part
23: candidate selection part
24, 204: feature information transmission part
201: feature value extraction part
203: secret sharing processing control part
205: processing performance adjustment part
206: congestion degree determination part
207: response performance acquisition part
300: secure computation server
302: secret sharing/secure computation processing part
9000: computer
9010: CPU (Central Processing Unit)
9020: communication interface
9030: memory
9040: auxiliary storage device

What is claimed is:

1. An authentication candidate extraction apparatus, comprising:
at least a processor; and
a memory in circuit communication with the processor,
wherein the processor is configured to execute program instructions stored in the memory to implement:

a biometric information input part that receives biometric information of a to-be-authenticated subject, moving from a first spot to a second spot, acquired at the first spot;

a feature information storage part that stores feature information used for authentication of the to-be-authenticated subject;

a candidate selection part that selects a feature information candidate to be used for authentication processing by way of a predetermined secure computation scheme using feature information extracted from the biometric information acquired at the first spot;

a feature information transmission part that transmits the selected feature information candidate to an authentication apparatus that performs the authentication processing using biometric information of the to-be-authenticated subject acquired at the second spot; and a processing performance adjustment part that adjusts performance of candidate selection process for the authentication processing based on an estimated time for the to-be-authenticated subject to reach the second spot from the first spot so that a candidate satisfying a predetermined required accuracy is extracted.

2. The authentication candidate extraction apparatus according to claim 1, wherein the biometric information is a face image captured by cameras installed at the first and the second spots.

3. The authentication candidate extraction apparatus according to claim 1, wherein the second spot is a spot in front of a ticket gate at a train station, and the authentication apparatus controls the ticket gate of the station.

4. The authentication candidate extraction apparatus according to claim 1, wherein the candidate selection part sets a number of the feature information candidates for the authentication processing so that the authentication apparatus completes the authentication processing within a predetermined period of time.

5. The authentication candidate extraction apparatus according to claim 1, wherein the feature information transmission part transmits the feature information extracted from the biometric information acquired at the first spot as the feature information candidate for the authentication processing.

6. The authentication candidate extraction apparatus according to claim 1, wherein the apparatus further executes:
converting features extracted from the biometric information acquired at the first spot into share information by way of secret sharing and transmitting the share information to predetermined secret sharing servers; and
reconstructing feature information serving as the feature information candidate for the authentication processing based on information received from the predetermined secret sharing servers and transmitting the reconstructed feature information as the feature information candidate for the authentication processing.

7. The authentication candidate extraction apparatus according to claim 1, wherein the processing performance adjustment part calculates the estimated time based on at least one of distance between at least the first spot and the second spot and a degree of congestion between the first and the second spots.

8. The authentication candidate extraction apparatus according to claim 1, wherein
the biometric information acquired at the first spot is a face image of the to-be-authenticated subject, and
the processing performance adjustment part adjusts the performance of the candidate selection process according to a quality of the image.

9. The authentication candidate extraction apparatus according to claim 1, wherein the processing performance adjustment part adjusts the performance of the candidate selection process according to a response time of the authentication processing of the authentication apparatus.

10. The authentication candidate extraction apparatus according to claim 1, wherein the processing performance adjustment part adjusts the performance of the candidate selection process for the authentication processing by increasing/decreasing a number of digits of feature values included in the feature information used for extraction of the feature information candidate for the authentication processing or a number of the feature values.

11. An authentication system, comprising:
an authentication candidate extraction apparatus comprising:
at least a processor; and
a memory in circuit communication with the processor, wherein the processor is configured to execute program instructions stored in the memory to implement:
a biometric information input part that receives biometric information of a to-be-authenticated subject, moving from a first spot to a second spot, acquired at the first spot;
a feature information storage part that stores feature information used for authentication of the to-be-authenticated subject;
a candidate selection part that selects a feature information candidate to be used for authentication processing by way of a predetermined secure computation scheme using feature information extracted from the biometric information acquired at the first spot;
a feature information transmission part that transmits the selected feature information candidate to an authentication apparatus that performs the authentication processing using biometric information of the to-be-authenticated subject acquired at the second spot; and
a processing performance adjustment part that adjusts performance of candidate selection process for the authentication processing based on an estimated time for the to-be-authenticated subject to reach the second spot from the first spot so that a candidate satisfying a predetermined required accuracy is extracted; and
an authentication apparatus comprising:
at least a processor; and
a memory in circuit communication with the processor, wherein the processor is configured to execute program instructions stored in the memory to implement:
a biometric information input part that receives the biometric information acquired at the second spot; and
an authentication processing part that performs the authentication processing using the feature information candidate received from the authentication candidate extraction apparatus and the feature information extracted from the biometric information acquired at the second spot.

12. An authentication candidate extraction method comprising:
adjusting performance of a feature information candidate selection process for an authentication processing based on an estimated time for a to-be-authenticated subject to reach a second spot from a first spot so that a candidate satisfying a predetermined required accuracy can be extracted;

selecting the feature information candidate to be used for the authentication processing by way of a predetermined secure computation scheme using feature information extracted from biometric information of the to-be-authenticated subject, moving from the first spot to the second spot, acquired at the first spot; and transmitting the selected feature information candidate to an authentication apparatus that performs the authentication processing using biometric information of the to-be-authenticated subject acquired at the second spot.

13. A non-transitory computer readable recording medium storing a program executable by a computer to perform:

a process of adjusting performance of a feature information candidate selection process for an authentication processing based on an estimated time it takes a to-be-authenticated subject to reach a second spot from a first spot so that a candidate satisfying predetermined required accuracy can be extracted;

a process of selecting the feature information candidate to be used for authentication processing by way of a predetermined secure computation scheme using features extracted from biometric information of the to-be-authenticated subject, moving from the first spot to the second spot, acquired at the first spot; and a process of transmitting the selected feature information candidate to an authentication apparatus that performs the authentication processing using biometric information of the to-be-authenticated subject acquired at the second spot.

14. The authentication candidate extraction method according to claim 12, wherein the biometric information is a face image captured by cameras installed at the first and the second spots.

15. The authentication candidate extraction method according to claim 12, wherein the second spot is a spot in front of a ticket gate at a train station, and the method further comprises controlling the ticket gate of the station.

16. The authentication candidate extraction method according to claim 12, wherein the selecting comprises setting a number of the feature information candidates for the authentication processing so that the authentication processing is completed within a predetermined period of time.

17. The authentication candidate extraction method according to claim 12, wherein the method further comprises transmitting the feature information extracted from the biometric information acquired at the first spot as the feature information candidate for the authentication processing.

18. The authentication candidate extraction method according to claim 12, wherein the method further comprises:

converting features extracted from the biometric information acquired at the first spot into share information by way of secret sharing and transmitting the share information to predetermined secret sharing servers; and reconstructing feature information serving as the feature information candidate for the authentication processing based on information received from the predetermined secret sharing servers and transmitting the reconstructed feature information as the feature information candidate for the authentication processing.

19. The authentication candidate extraction method according to claim 12, wherein the adjusting the processing performance comprises calculating the estimated time based on at least one of distance between at least the first spot and the second spot and a degree of congestion between the first and the second spots.

20. The authentication candidate extraction method according to claim 12, wherein the biometric information acquired at the first spot is a face image of the to-be-authenticated subject, and the adjusting the processing performance comprises adjusting the performance of the candidate selection process according to a quality of the image.

21. The authentication candidate extraction method according to claim 12, wherein the adjusting the processing performance comprises adjusting the performance of the candidate selection process according to a response time of the authentication processing of the authentication apparatus.

22. The authentication candidate extraction method according to claim 12, wherein the adjusting the processing performance comprises adjusting the performance of the candidate selection process for the authentication processing by increasing/decreasing a number of digits of feature values included in the feature information used for extraction of the feature information candidate for the authentication processing or a number of the feature values.

* * * * *